US011418064B1

(12) United States Patent
Snyder

(10) Patent No.: US 11,418,064 B1
(45) Date of Patent: Aug. 16, 2022

(54) SYSTEM AND METHOD FOR PROVIDING DISJOINTED SPACE-BASED POWER BEAMING

(71) Applicant: MADE IN SPACE, INC., Moffett Field, CA (US)

(72) Inventor: Michael P. Snyder, Jacksonville, FL (US)

(73) Assignee: REDWIRE SPACE, INC., Jacksonville, FL (US)

(*) Notice: Subject to any disclaimer, the term of this patent is extended or adjusted under 35 U.S.C. 154(b) by 291 days.

(21) Appl. No.: 15/978,340

(22) Filed: May 14, 2018

Related U.S. Application Data

(60) Provisional application No. 62/505,331, filed on May 12, 2017.

(51) Int. Cl.
*H02J 50/20* (2016.01)
*B64G 1/44* (2006.01)
*H04B 7/185* (2006.01)
*H02J 50/40* (2016.01)

(52) U.S. Cl.
CPC .............. *H02J 50/20* (2016.02); *B64G 1/44* (2013.01); *H02J 50/40* (2016.02); *H04B 7/18521* (2013.01); *H04B 7/18513* (2013.01); *H04B 7/18515* (2013.01)

(58) Field of Classification Search
CPC ...... H02J 50/20; H02J 50/40; H04B 7/18521; H04B 7/18515; H04B 7/18513; B64G 1/44
See application file for complete search history.

(56) References Cited

U.S. PATENT DOCUMENTS

| 3,781,647 | A | * | 12/1973 | Glaser | B64G 1/428 322/2 R |
| 5,223,781 | A | * | 6/1993 | Criswell | B64G 1/428 244/172.8 |
| 5,260,639 | A | | 11/1993 | De Young et al. | |
| 6,495,751 | B2 | * | 12/2002 | Mikami | H02J 50/20 136/246 |
| 6,936,760 | B2 | | 8/2005 | Rogers et al. | |

(Continued)

FOREIGN PATENT DOCUMENTS

EP     2953236 A1 * 12/2015 ............. H02J 50/12

OTHER PUBLICATIONS

Leonics, "Basics of MPPT Solar Charge Controller," pp. 1-4, 2016 (Year: 2016).*

(Continued)

*Primary Examiner* — Pinping Sun
(74) *Attorney, Agent, or Firm* — Terry M. Sanks, Esq.; Beusse Sanks, PLLC

(57) ABSTRACT

A system including a plurality of space-based satellites is disclosed where each satellite has at least one of an energy capture component and an energy generator component, an energy conversion component to convert the at least one of captured energy and generated energy into a power beam for wireless transmission, and a communication system to provide for each satellite in the plurality of space-based satellites to communicate between each other. The system also includes a controller to control power beam generation from at least one satellite of the plurality of satellites. Another system and method are also disclosed.

15 Claims, 9 Drawing Sheets

(56) References Cited

U.S. PATENT DOCUMENTS

| | | | | |
|---|---|---|---|---|
| 7,077,361 | B1* | 7/2006 | Rabinowitz | B64G 1/44 244/172.8 |
| 9,150,312 | B2 | 10/2015 | Ellinghaus | |
| 9,871,387 | B1* | 1/2018 | Bell | H02J 7/027 |
| 2002/0058477 | A1* | 5/2002 | Chapelle | H04W 52/283 455/431 |
| 2007/0053314 | A1* | 3/2007 | Gat | H04B 7/216 370/316 |
| 2009/0229656 | A1* | 9/2009 | Tillotson | F24S 20/80 136/251 |
| 2010/0124922 | A1* | 5/2010 | Palmer | H04B 7/18543 455/427 |
| 2010/0148723 | A1* | 6/2010 | Cook | G06K 19/07749 320/108 |
| 2010/0276547 | A1* | 11/2010 | Rubenchik | B64G 1/222 244/172.8 |
| 2012/0025750 | A1* | 2/2012 | Margo | H02S 10/40 320/101 |
| 2013/0147427 | A1* | 6/2013 | Polu | H02J 7/025 320/108 |
| 2016/0065006 | A1* | 3/2016 | Woods | H02J 50/30 307/84 |
| 2017/0047463 | A1* | 2/2017 | Hajimiri | H03F 3/245 |
| 2017/0047987 | A1* | 2/2017 | Pellegrino | H03F 3/45183 |
| 2017/0077736 | A1* | 3/2017 | Leabman | H04B 5/0037 |
| 2017/0222597 | A1* | 8/2017 | Behrens | H02S 20/23 |

OTHER PUBLICATIONS

Mankins, "SPS-ALPHA: The First Practical Solar Power Satellite via Arbitrarily Large Phased Array" pp. 1-113, 2012 (Year: 2012).*

Mankins, "SPS-ALPHA: The First Practical Solar Power Satellite via Arbitrarily Large Phased Array" pp. 1-113 (Year: 2012).*

Office of Energy Efficient & Renewable Energy. How Does Solar Work?, retrieved May 5, 2021. https:/www.energy.gov/eere/solar/how-does-solar-work.

Office of Nuclear Energy, Space and Defense Power Systems, retrieved May 5, 2021. https://www.energy.gov/ne/nuclear-reactor-technologies/space-power-systems.

* cited by examiner

SYSTEM AND METHOD FOR PROVIDING DISJOINTED SPACE-BASED POWER BEAMING

CROSS-REFERENCE TO RELATED APPLICATIONS

This application claims the benefit of U.S. Provisional Application No. 62/505,331 filed May 12, 2017, the entirety of which is incorporated by reference.

BACKGROUND

Embodiments relate to a space-based power generation and, more particularly, to operating a plurality of space-based power generation satellites where orbital placement of individual satellites may vary satellite-to-satellite and where the satellites work as a team to provide for an environmentally safe amount of power to travel from space to a remotely located receiver.

Power beaming architectures from space traditionally rely on large space-based platforms that deliver a significant amount of power to a planetary surface such as, but not limited to, Earth. With respect to solar energy, potential advantages of collecting solar energy in space include a higher collection rate and a longer collection period due to a lack of a diffusing atmosphere. Most of the solar power beaming proposals are focused on a modest gigawatt-range microwave system, comparable to a large commercial power plant, in space. Such a system would require launching tons of material to orbit to build such a system which would be an expensive proposition considering the number of rocket launches are needed further, compounded with the need for robotic of man-based labor to assemble the resulting space platform. The preferred placement of such a system is at an orbiting location where the sun constantly shines on the platform.

Even though multiple space-based power generating systems have also been proposed, they have been proposed to be located in either a low Earth orbit or geosynchronous orbit where the satellites operate sequentially in delivering power to a ground receiver.

With respect to Earth, an amount of power transmitted to an Earth-based receiver is limited by at least two factors: regulatory concerns in certain areas; and the threshold that exists before raising the temperature of the surrounding atmosphere the beam travels through if transmission is going to a ground-based receiver. In other words, the amount of power being beamed to Earth should be of a level that it is not detrimental to humans, animals and the environment. As a non-limiting example, Occupational Safety and Health Agency (OSHA) has set a maximum beam exposure limit at 10 mW/cm$^2$.

Also, proposed ground beam destinations are not expected to be portable and likely will require significant infrastructure. They are anticipated to be infrastructures that are fixed at a defined location.

Therefore, developers and users of space generated power that is beamed to a planet-based receiver would benefit from having power beamed to the planet-based receiver that is environmentally safe and that can work with a ground-based receiver that is moveable from one location to another.

SUMMARY

Embodiments relate to a system and a method to operate a plurality of space-based power generation satellites where orbital placement of individual satellites may vary satellite-to-satellite and where the satellites work as a team to provide for an environmentally safe amount of power to travel from space to a remote receiver. The system comprises a plurality of space-based satellites to at least one of capture energy and generate energy, the energy is convertible to a power that is transmittable to at least one of another space-based object and a planetary-based station. The system further comprises an energy conversion system on a satellite of the plurality of space-based satellites to convert the at least one of captured energy and generated energy to the power and to transmit the power. The system further comprises a controller to control at least one of collection of energy by at least one satellite of the plurality of space-based satellites, wireless transmission of the power by at least one satellite of the plurality of space-based satellites, reception of the power on at least one satellite of the plurality of space-based satellites, and communication between the plurality of satellites. The system also comprises a receiver to receive power wirelessly transmitted from one or more of the satellites of the plurality of space-based satellites. The controller regulates a power beam from at least one of the satellites of the plurality of space-based satellites as the power is transmitted to the receiver to provide for radiation from the power beam to be at an acceptable exposure limit for a life form during wireless transmission.

Another system comprises a plurality of space-based satellites, each satellite comprising at least one of an energy capture component and an energy generator component, an energy conversion component to convert the at least one of captured energy and generated energy into a power beam for wireless transmission, and a communication system to provide for each satellite in the plurality of space-based satellites to communicate between each other. The system further comprises a controller to control power beam generation from at least one satellite of the plurality of satellites.

The method comprises transmitting power from a plurality of space-based power generating satellites to a planet-based receiver. The method further comprises controlling transmission of the power to the receiver, with a controller, to provide for one or more of the plurality of satellites to transmit power at a same time to the receiver where the collective amount of transmitted power at any given time remains below a maximum acceptable exposure limit.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

Figure 1:
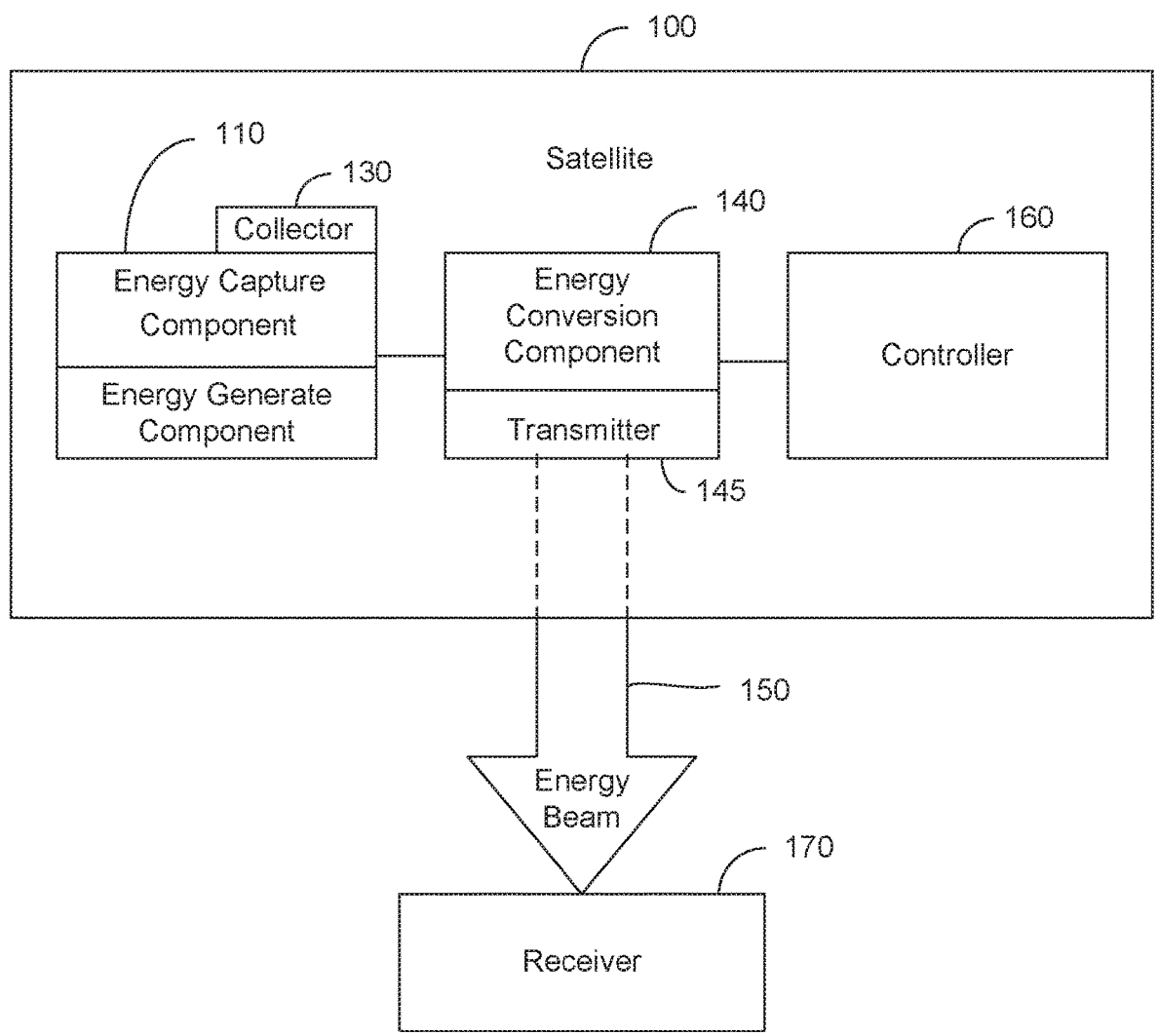
FIG. 1 illustrates a block diagram of an embodiment of a satellite disclosed herein.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

FIG. 1 illustrates a block diagram of an embodiment of a satellite disclosed herein. The satellite 100 comprises at least one of an energy capture component 110 and an energy generate component 120. A non-limiting example of a capture component 110 may be a solar array or a reflector that directs solar energy to a collector 130 on the satellite 100. A non-limiting example of a generating energy component 120 may be a nuclear reactor. An energy conversion element, component or device 140 may be available to convert the energy generated or collected to a power that may be transmittable by transmitter 145, via an energy beam 150, to at least one of another space-based object and a ground-based, or planetary-based, station. As used herein, space-based refers to an object in outer space, including, but not limited to, low Earth, or planetary, high Earth, or traveling through outer space. The form of the energy beam is not limited to a particular form.

A controller 160 may be provided to control at least one of collection of energy, wireless transmission of the power, and reception of power from another satellite. The controller 160 may regulate one or more of satellites 100 as power is transmitted, wirelessly, to a ground-based, planetary-based, receiver 170 at any given time so that the one or more satellites 100 are collectively transmitting power at an intensity less than a maximum acceptable exposure limit to the ground-based receiver 170. Though the receiver 170 is shown as being ground based, in other embodiments, the receiver 170 may be space-based such as, but not limited to, on or as part of another satellite, space station or transport vehicle.

Figure 2:
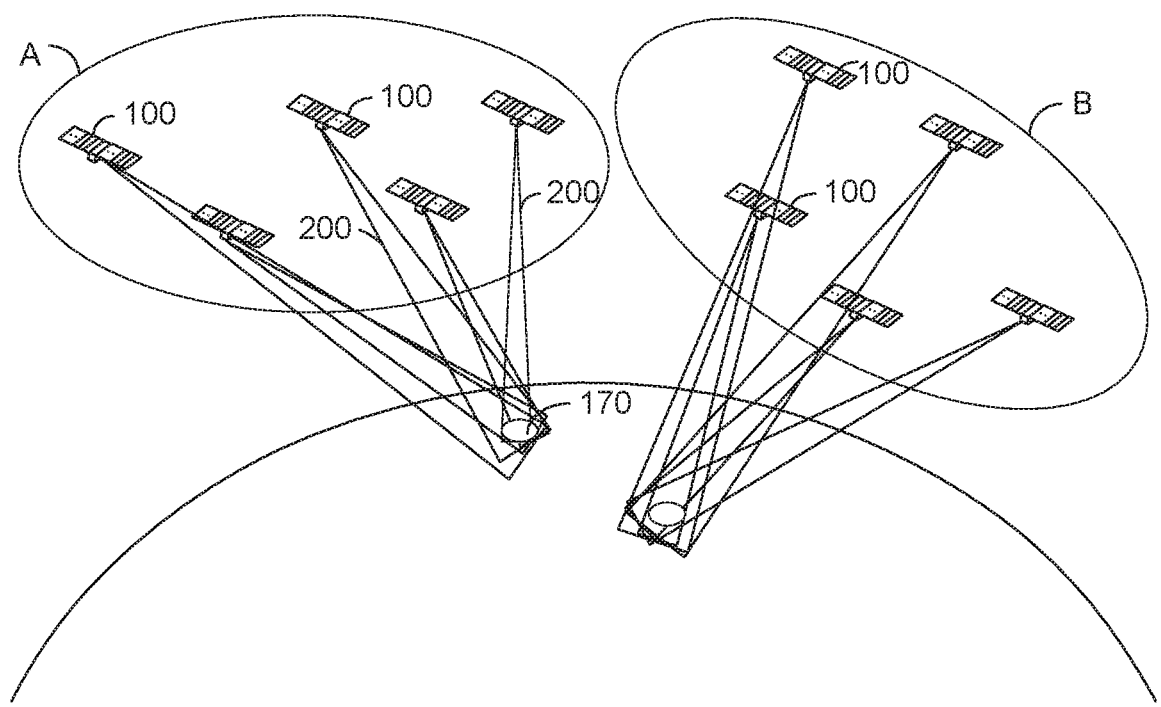
FIG. 2 illustrates an embodiment of two satellite groups in different orbits beaming power to two distinct ground receivers.

The power beam, since no shielded insulation associated with a wire is used, may produce a level of electromagnetic radiation such as, but not limited to, microwaves or laser beams. Limiting an intensity level of the power beaming to reduce exposure to potentially injurious electromagnetic fields is desired. Thus, the controller's ability to regulate power beaming intensity may reside on only a lead satellite 100' (as shown in FIG. 2) within a swarm or group of satellites A, B, wherein commands to regulate power beaming intensity of the other satellites 100 is communicated to the other satellites 100 in the swarm A, B from the lead satellite 100'. The controller 170 may also function to direct positioning of the satellite 100 or satellites 100 in a swarm or energy collectors 130 that are a part of the energy capture component 110 or the energy generate component 120.

FIG. 2 illustrates an embodiment of two satellite groups beaming power to two distinct ground receivers. The satellites in a first group, A, may all be in a same first orbit, whereas the satellites 100 in the second group, B, may be in a same second orbit. Though two orbits are mentioned, both satellite groups, A, B, may have satellites 100 in a same orbit. As further illustrated in FIG. 2, each group A, B may be beaming power, or providing a power beam 200, back to a planet at two different ground receivers 170. Though the term "ground-based" and "planetary-based" are used, these terms are not meant to be limiting. The ground-based or planetary-based receiver may include a receiver 170 that is located at sea, underground, and located in an airspace above the ground of a planetary body, any of which may be considered an environment of a planetary body. A planetary body may be any celestial body, including, but not limited to, Earth, a moon, an asteroid, a comet, another planet, etc. As discussed above, the receiver 170 may be located in outer space ("space") to provide power to a space-based system.

Figure 3:
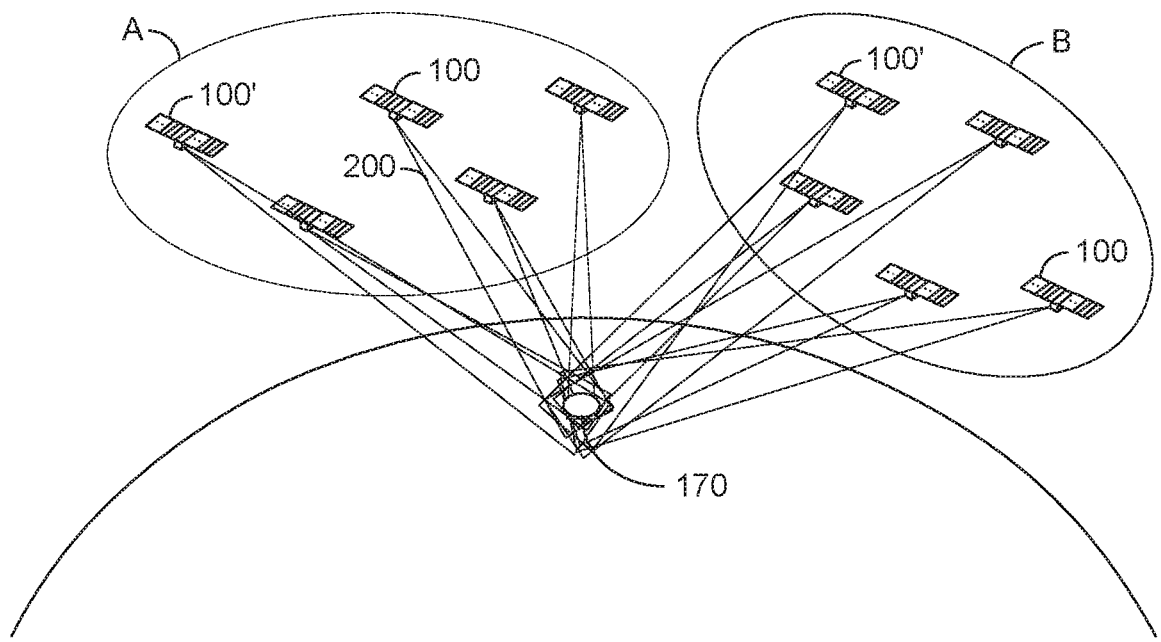
FIG. 3 illustrates an embodiment of two satellite groups.

FIG. 3 illustrates another embodiment of two satellite groups. The satellite groups A, B may be in different orbits where all satellites 100 are beaming power to a single ground receiver 170. As discussed above with respect to FIG. 1, the power emitted or beamed from each satellite 100 may be regulated so that a collective amount of power beamed to a specific ground receiver 170 does not exceed a maximum beam intensity. Furthermore, in the embodiments shown in FIGS. 2-6, individual beam intensity does not have to result in each satellite 100 beaming to a same location with a same beam intensity. The intensity from each satellite 100 may vary for a plurality of reasons such as, but not limited to, an amount of power to beam available on a particular satellite 100, health condition of a particular satellite 100, whether a particular satellite 100 is within line of sight to the location of the receiver 170, etc.

Figure 4:
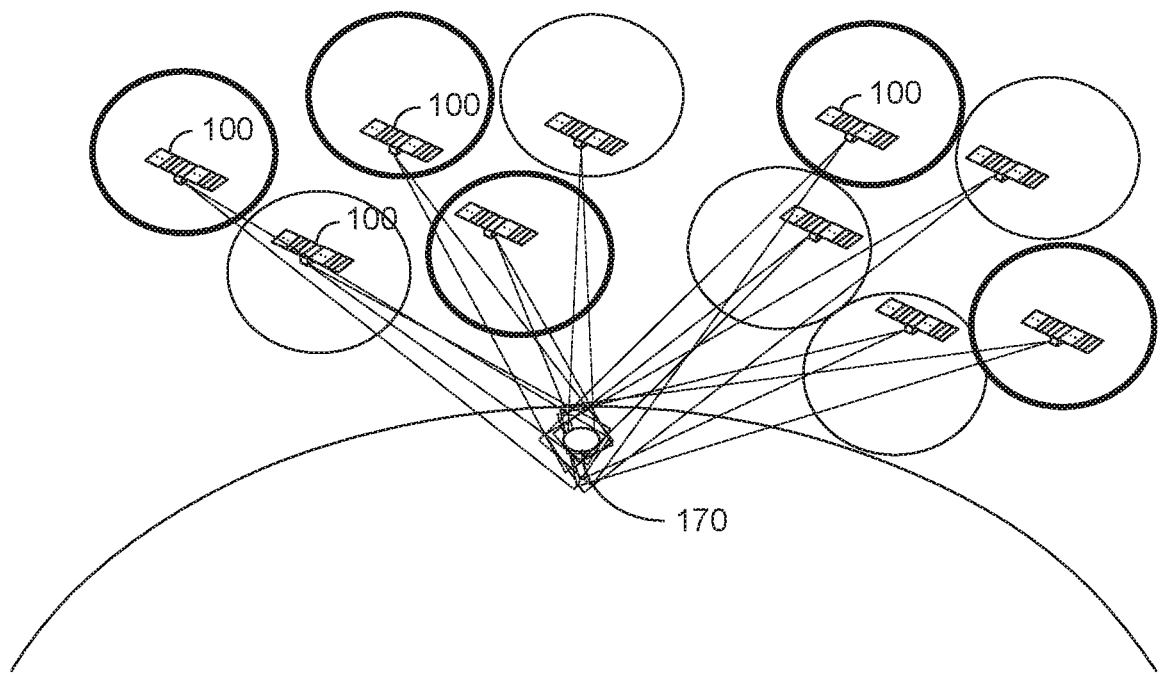
FIG. 4 illustrates another embodiment of two satellite groups.

FIG. 4 illustrates another embodiment of two satellite groups. The individual satellites 100 in each group discussed above are not grouped. Therefore, the satellites 100 may not all be in a same orbit of other satellites 100. Thus, there are no satellite groups. Instead, all satellites 100 are beaming power to a single ground receiver 170, regardless of attitude. Multiple satellites 100 may be focused on beaming power to a single receiver 170. In this embodiment, the collective beam power may be above a desired power intensity level, or radiation level, at the receiver 170 since a plurality of beams are being received at a single location 170. However, prior to reaching the receiver 170, each individual power beam 200 is below the maximum intensity level, or radiation level. Since the radiation level at the receiver 170 may exceed an acceptable radiation level, radiation shielding may be utilized to contain the radiation at the receiver 170. As discussed herein, power beams 200 may be steered to achieve any desired surface flux that is compatible with the beam width/pattern and number of satellites beaming at a given time. Though the satellites 100 are discussed above regarding FIG. 4 as being tied or associated with a particular group, the satellites 100 may be rearranged and grouped again, as is illustrated by the circles around each respective satellite where a bolder circle represents a first group and a thinner circle represents a second group.

Figure 5:
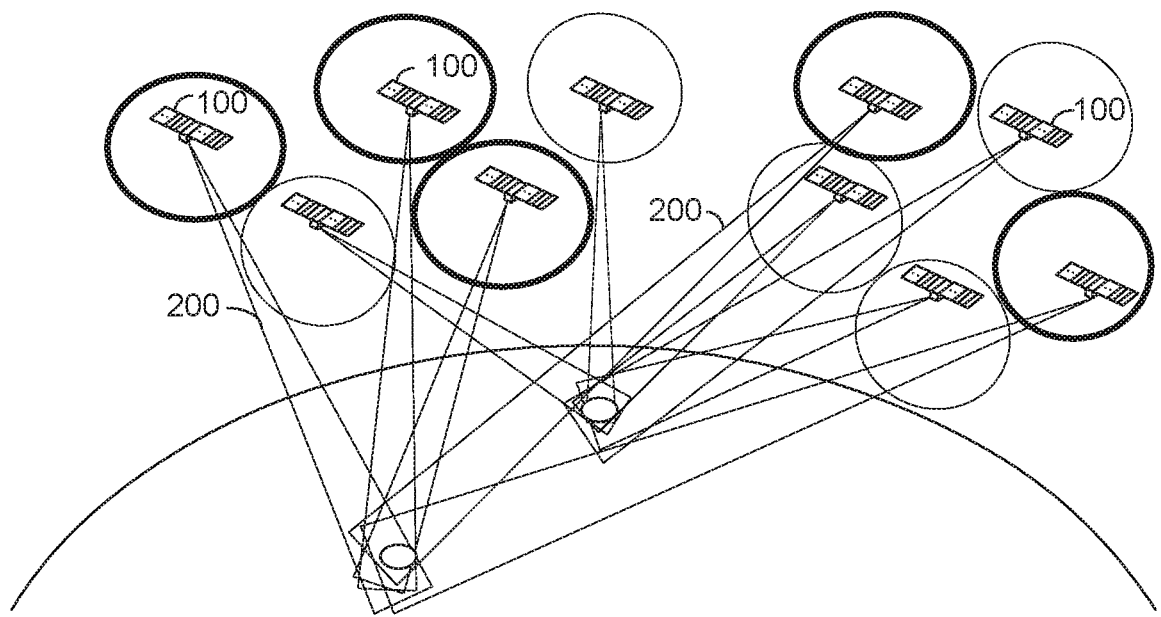
FIG. 5 illustrates another embodiment of two satellite groups.

FIG. 5 illustrates another embodiment of a plurality of satellites. The individual satellites are not in any groups and are not all in a same orbit of other satellites, though they may be. As illustrated in FIG. 2, the satellites 100, based on group association, may be beaming power to two distinct ground receivers. As shown, individual satellites 100 may beam power 200 to designated receivers 170, where the satellites are not tied together.

Figure 6:
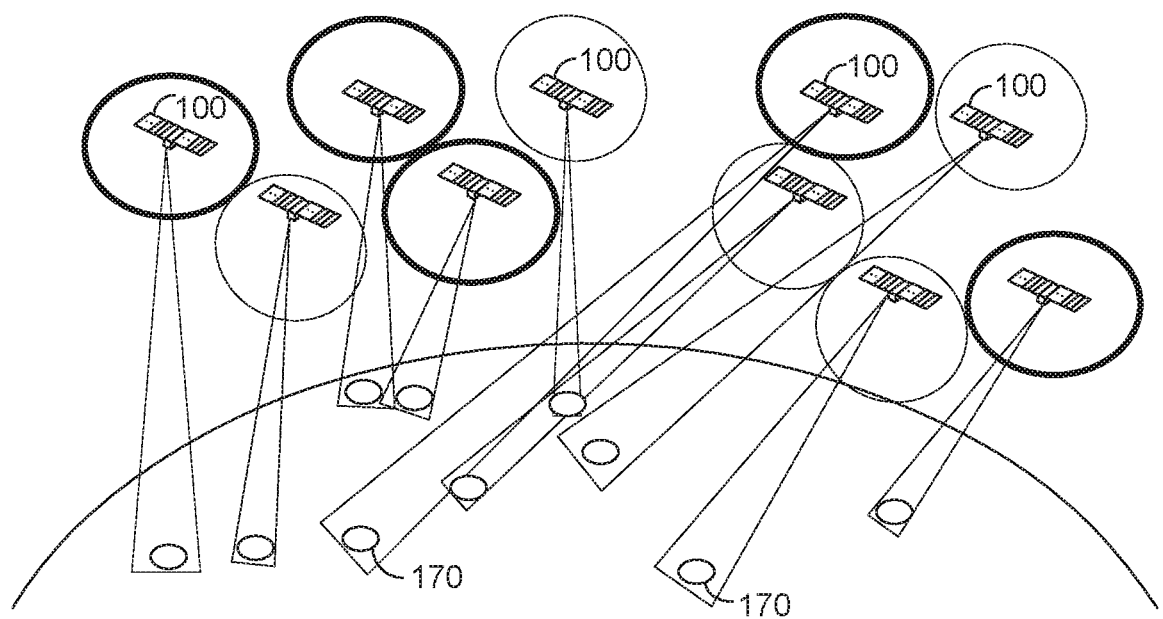
FIG. 6 illustrates another embodiment of two satellite groups.

FIG. 6 illustrates another embodiment of a plurality of satellites. The individual satellites 100 are not necessarily in a same orbit of other satellites 100. The beaming power 200 from respective satellites 100 may be beamed to a specific receiver 170. Thus, more than two receivers 170 may be available. In another embodiment, an individual satellite 100 may be able to beam power 200 to more than one receiver 170 at a same time. In another embodiment, the satellite 100 may provide power in sequence to a plurality of receivers 170. For sequence power beaming, the satellite 100 may switch between receivers 170 depending on which receiver 170 is in range of the respective satellite 100. Alterable ground focus may enable power beaming to mobile or temporary locations.

Figure 7:
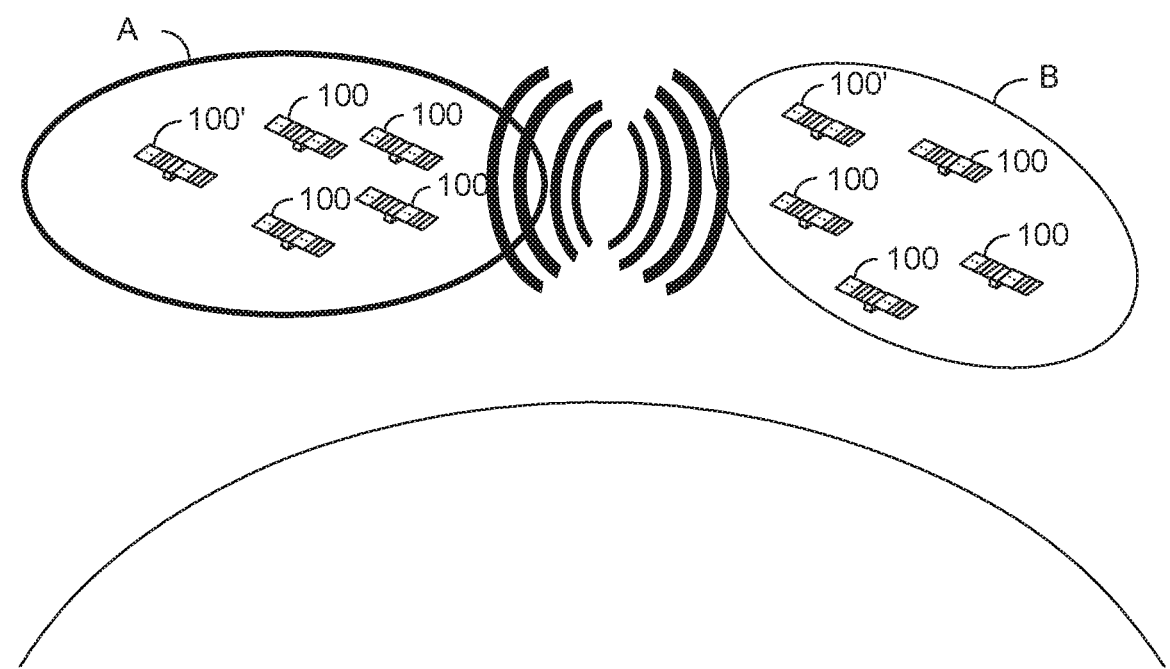
FIG. 7 illustrates an embodiment of communications between two satellite groups.

FIG. 7 illustrates an embodiment of communication between two satellite groups. The satellite groups A, B communicate between themselves to coordinate a beaming solution. In an embodiment, there is a lead satellite 100' in each group A, B. The lead satellites 100' may communicate between each other and to the other satellites 100 in its respective group. The communication with a group A, B by the lead satellite 101' may be in parallel with the other satellites 100 in the group A, B or in series, like a daisy chain. In another embodiment, communications between all satellites 100' 100 may be performed similar to packet routing over the Internet, using either circuit switching or packet switching. Packet switching may occur within each individual group A, B or collectively within all groups collectively. The communication between satellites 100 or groups A, B may be used to determine a power beaming 200 sequence.

Figure 8:
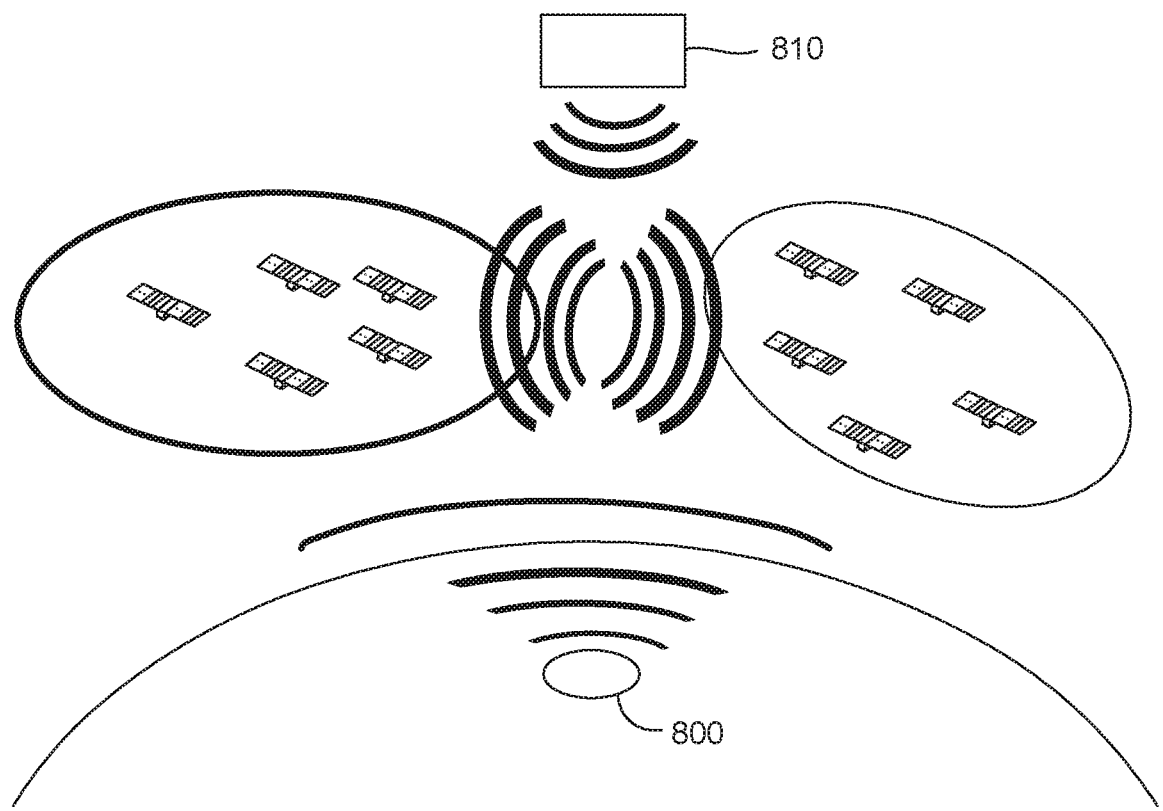
FIG. 8 illustrates another embodiment of communications between two satellite groups.

FIG. 8 illustrates an embodiment of communications between two satellite groups and a remote location. Utilizing embodiments disclosed above with respect to FIG. 7, the satellite groups A, B may communicate between themselves to coordinate a beaming solution. The beaming solution may be sent from at least one of a terrestrial location 800 and another space-based location 810. As disclosed above, the space-based location 810 may be another satellite, space station or space transportation system. The space-based location may be the receiver 170 or another location. Information may also be sent back to the at least one of terrestrial location 170 and space-based location 800. Thus, in addition to power being beamed, communications may also be provided between locations.

Figure 9:
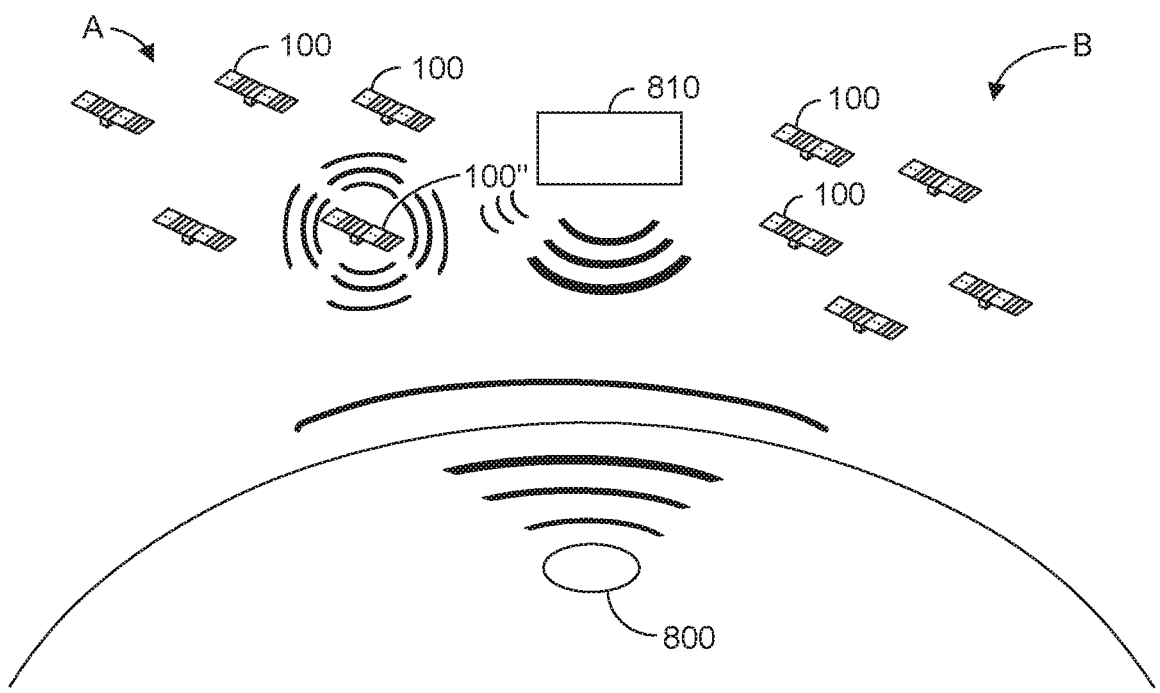
FIG. 9 illustrates an embodiment of communication with two satellite groups.

FIG. 9 illustrates an embodiment of communication with two satellite groups. A command may be sent from at least one of a terrestrial location 800 and another space-based location 900 to a single satellite. The single satellite 100" may then transmit the command to all other power beaming satellites 100, in both satellite groups. The single satellite 100" may also send information back to the at least one of the terrestrial location 800 and another space-based location 810.

Figure 10:
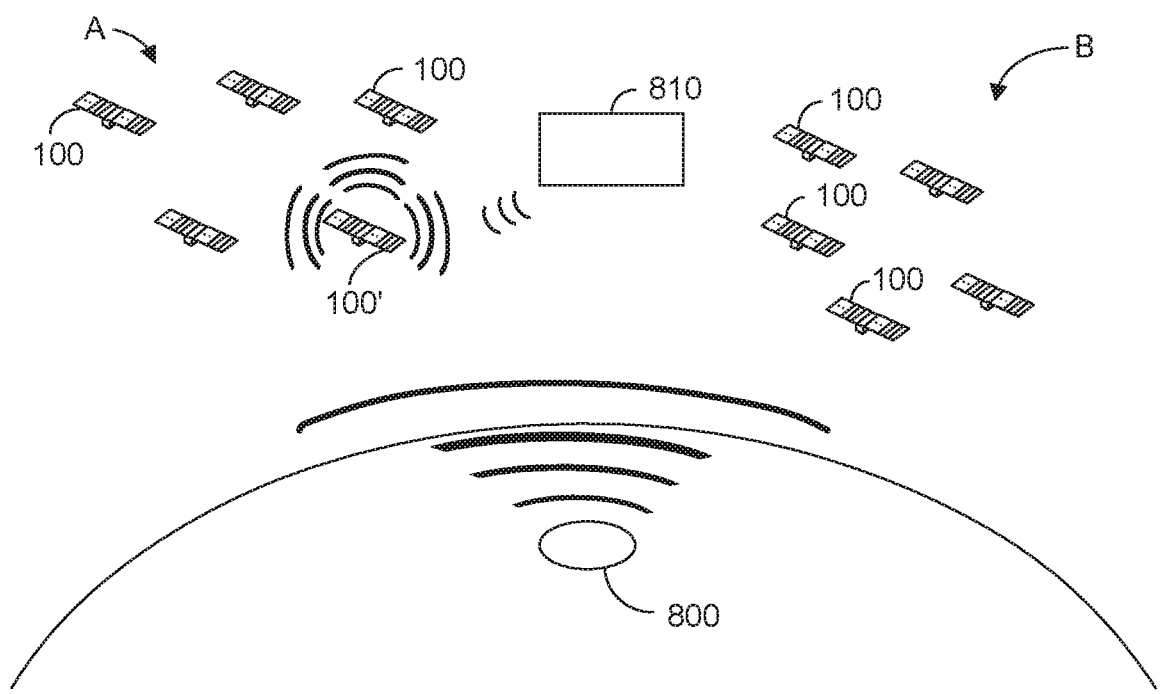
FIG. 10 illustrates another embodiment of communication with two satellite groups.

FIG. 10 illustrates another embodiment of communication with two satellite groups. A command may be sent from at least one of a terrestrial location 800 and another space-based location 810 to a single satellite 100' which then transmits the command to all other power beaming satellites 100. Information is not disclosed as being sent back to at least one of the terrestrial location 800 and another space-based location 810.

Figure 11:
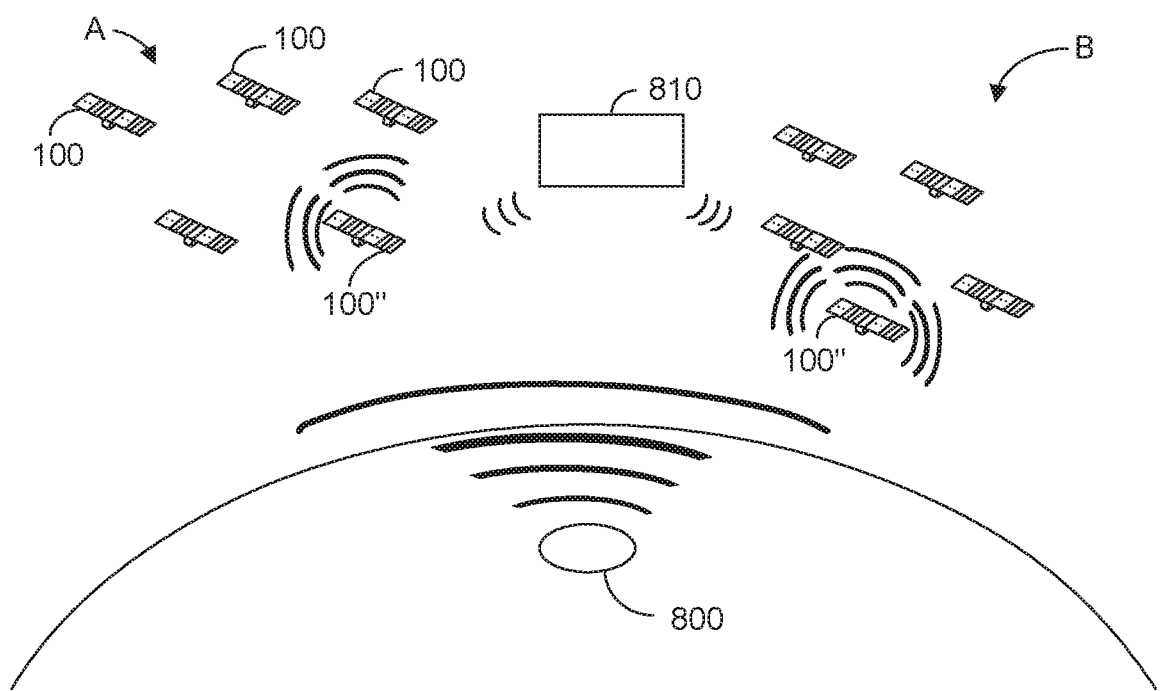
FIG. 11 illustrates another embodiment of communication with two satellite groups.

FIG. 11 illustrates another embodiment of communication with two satellite groups. A command may be sent to a single satellite 100" in each satellite group. Each single satellite 100" may transmit the command to other satellites 100 in its respective satellite group A. Though not shown, information may also be communicated back from each single satellite 100" to the at least one of the terrestrial location 800 and another space-based location 810.

Figure 12:
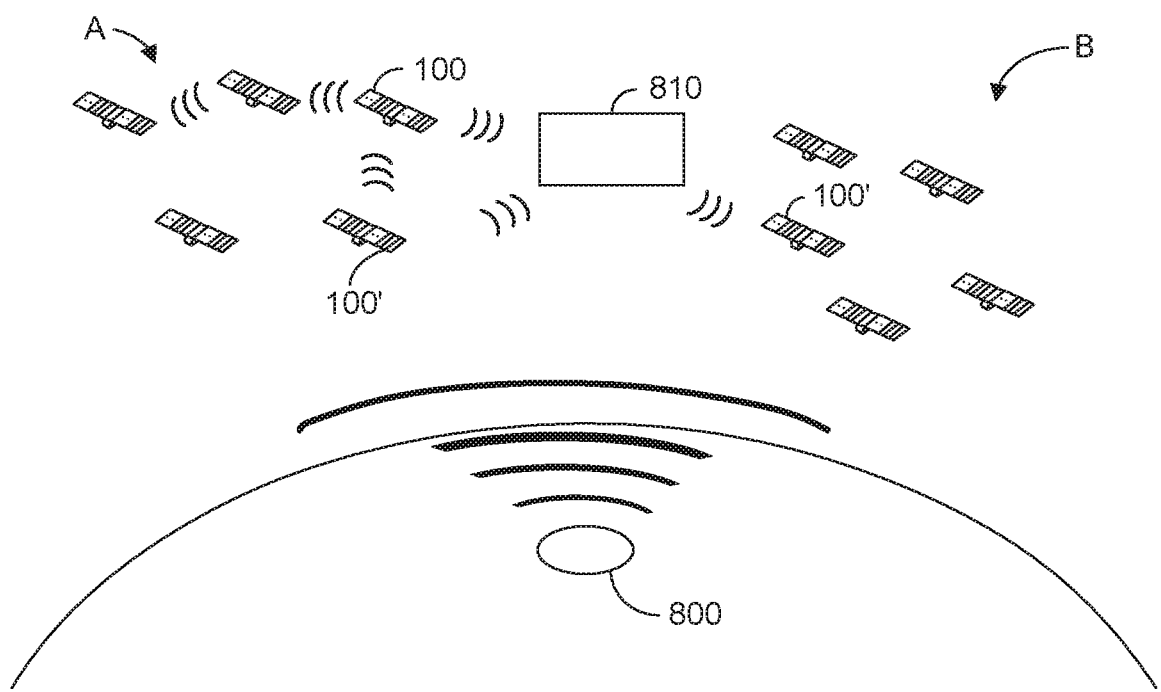
FIG. 12 illustrates an embodiment of communication with two satellite groups.

FIG. 12 illustrates another embodiment of communication with two satellite groups. A command may be sent to a single satellite 100', and communications in a respective satellite group are individually relayed from satellite-to-satellite, in series. The communication may then be relayed to a first satellite 100' in the second satellite group B. The communication may again be relayed in series through the second satellite group B.

Figure 13:
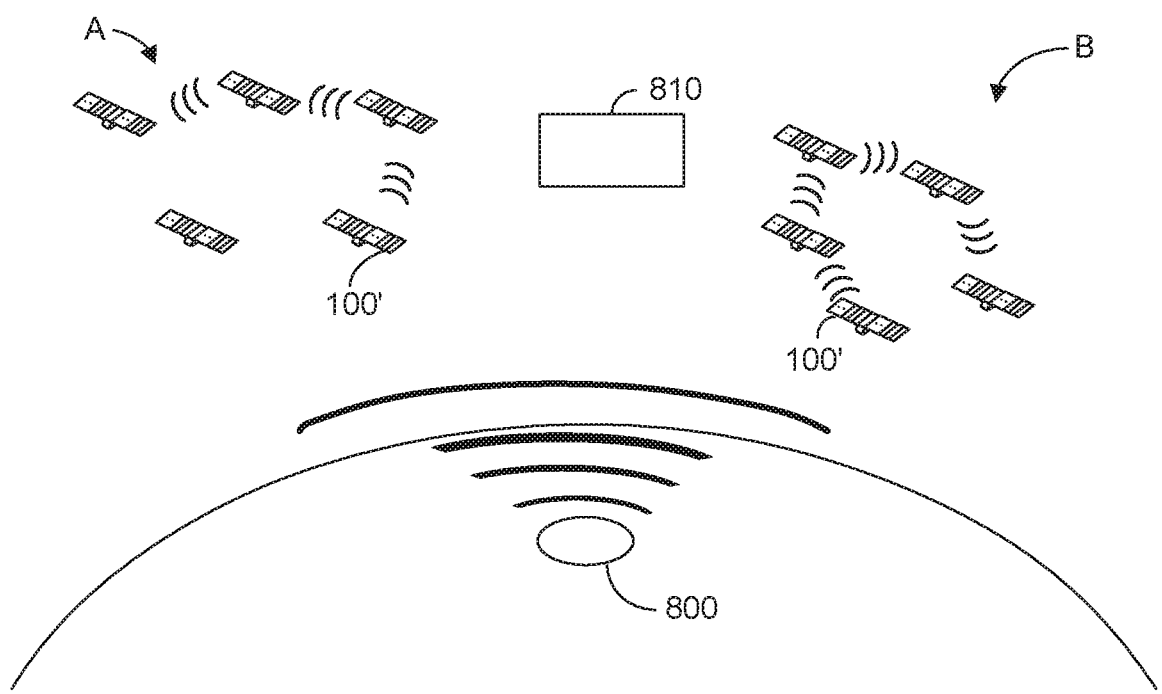
FIG. 13 illustrates an embodiment of communication with two satellite groups.

FIG. 13 illustrates an embodiment of communication with two satellite groups. A command may be sent to a single satellite 100' in each satellite group A, B. Communications in each respective satellite group A, B may be individually relayed from satellite-to-satellite 100 in each respective satellite group A, B or, in other words, serially.

As briefly stated above, the communication examples provided above may also be used if power is transmitted between satellites 100, as is disclosed above with respect to FIG. 1. Thus, the controller 160, as discussed above, may communicate between the plurality of satellites at least one of serially and in parallel to control at least one of power beam intensity, power beam activation, power beam deactivation, and power beam destination.

Figure 14:
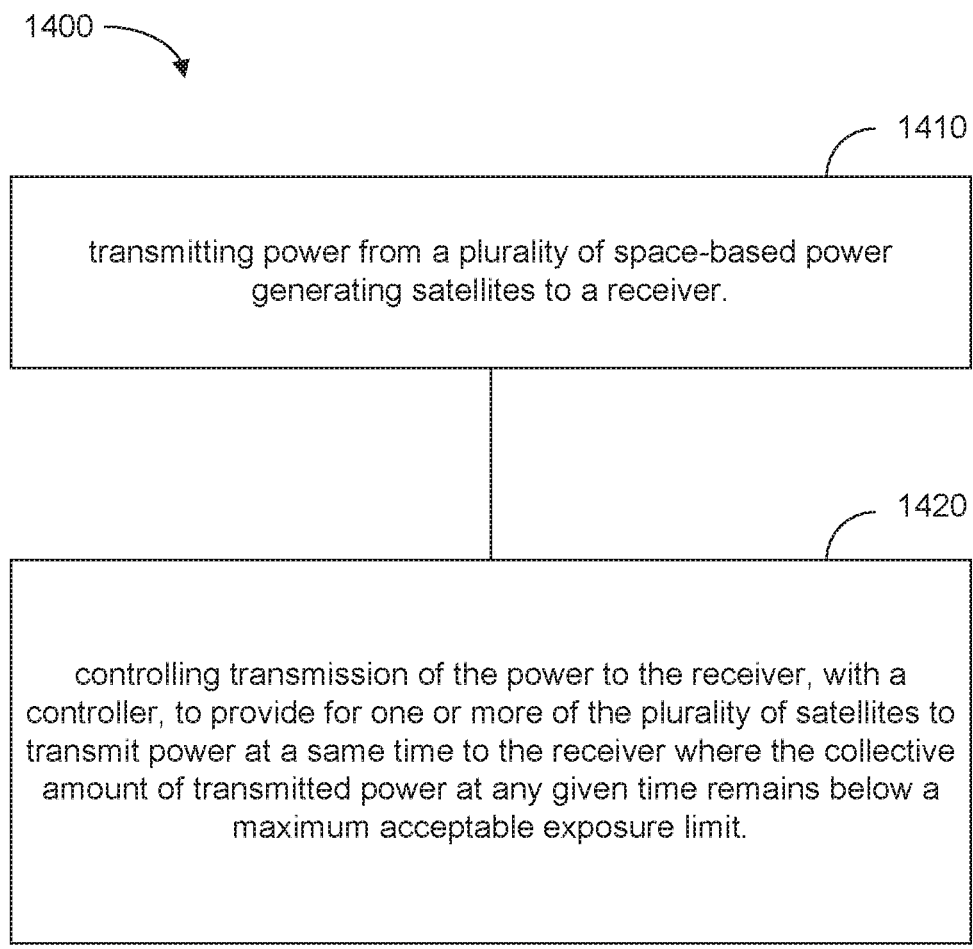
FIG. 14 illustrates a flow chart showing a method.

FIG. 14 illustrates a flow chart showing a method. The method 1400 comprises transmitting power from a plurality of space-based power generating satellites to a planet-based receiver, at 1410. The method 1400 further comprises controlling wireless transmission of the power to the ground-based receiver, with a controller, to provide for one or more of the plurality of satellites to transmit power at a same time to the ground-based receiver where the collective amount of transmitted power at any given time remains below a maximum acceptable exposure limit, at 1420.

Figure 15:
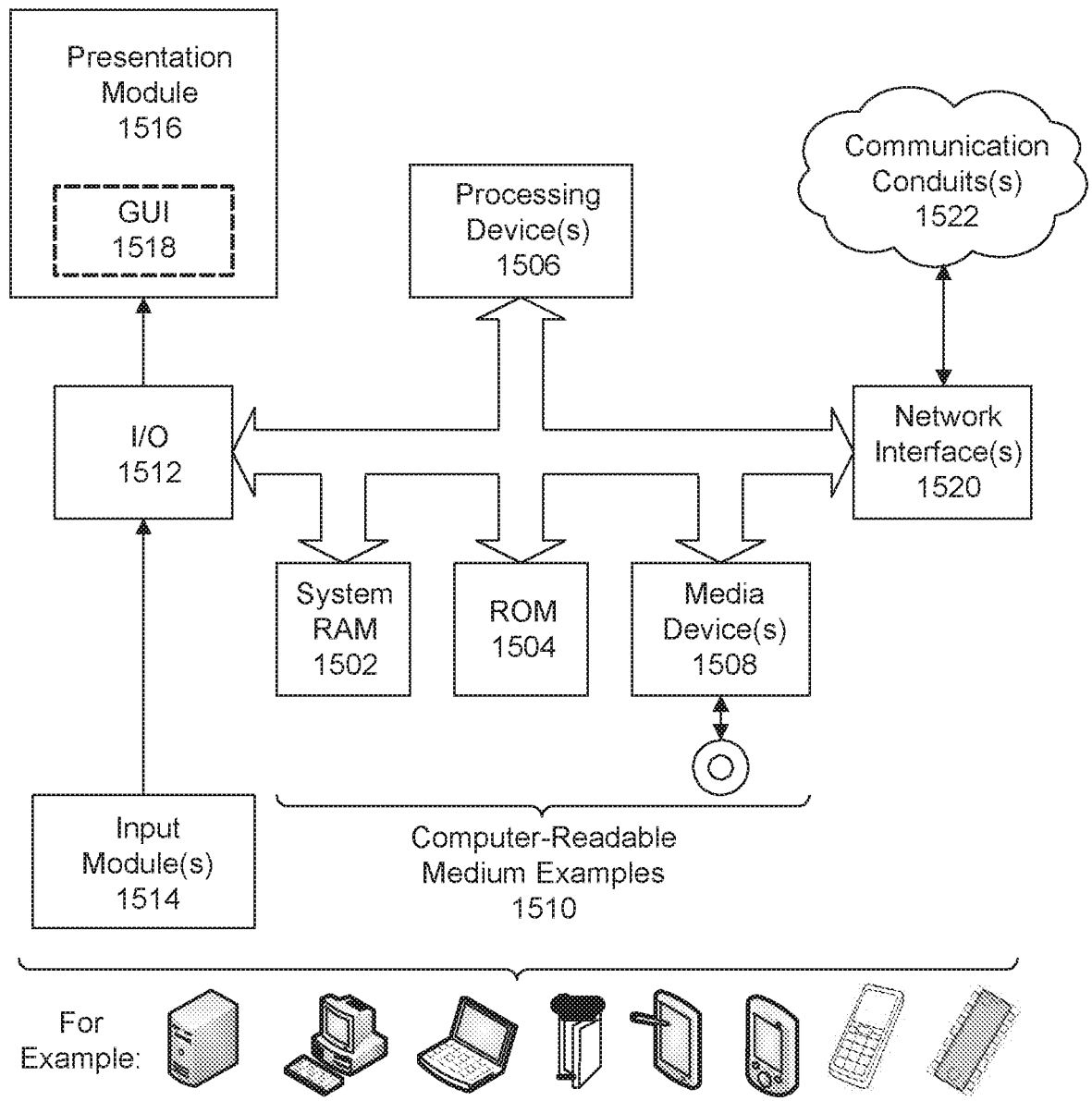
FIG. 15 sets forth an illustrative computing functionality that may be used with embodiments described herein.

FIG. 15 sets forth an illustrative computing functionality that may be used with embodiments described herein. The method described herein may be used in association with the computing functionality 1500 disclosed below. In all cases, computing functionality 1500 represents one or more physical and tangible processing mechanisms. The computing functionality 1500 may comprise volatile and non-volatile memory, such as random access memory (RAM) 1502 and read only memory ("ROM") 1504, as well as one or more processing devices 1506 (e.g., one or more central processing units (CPUs), one or more graphical processing units (Gus), and the like). The computing functionality 1500 also optionally comprises various media devices 1508, such as a hard disk module, an optical disk module, and so forth. The computing functionality 1500 may perform various operations identified above when the processing device(s) 1506 execute(s) instructions that are maintained by memory (e.g., RAM 1502, ROM 1504, and the like). The computing functionality may be performed under a plurality of different arrangements ranging from, but not limited to, collectively at a single location to over a wired or wireless network with remote servers hosted on the Internet to store, manage, and process data, rather than a local server or computer.

Instructions and other information may be stored on any computer readable medium 1510, including, but not limited to, static memory storage devices, magnetic storage devices, and optical storage devices. The term "computer readable medium" also encompasses plural storage devices. In all cases, computer readable medium 1510 represents some form of physical and tangible entity. By way of example, and not limitation, the computer readable medium 1510 may comprise "computer storage media" and "communications media."

"Computer storage media" comprises volatile and non-volatile, removable and non-removable media implemented in any method or technology for storage of information, such as computer readable instructions, data structures, program modules, or other data. The computer storage media may be, for example, and not limitation, RAM 1502, ROM 1504, EPSOM, Flash memory, or other memory technology, CD-ROM, digital versatile disks (DVD), or other optical storage, magnetic cassettes, magnetic tape, magnetic disk storage, or other magnetic storage devices, or any other medium which can be used to store the desired information and which can be accessed by a computer.

"Communication media" typically comprise computer readable instructions, data structures, program modules, or other data in a modulated data signal, such as carrier wave or other transport mechanism. The communication media may also comprise any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, FRO, infrared, and other wireless media. Combinations of any of the above are also included within the scope of computer readable medium.

The computing functionality 1500 may also comprise an input/output module 1512 for receiving various inputs (via input modules 1514), and for providing various outputs (via one or more output modules). One particular output module mechanism may be a presentation module 1516 and an associated graphic user interface ("GUI") 1518. The computing functionality 1500 may also include one or more network interfaces 1520 for exchanging data with other devices via one or more communication conduits 1522. In some embodiments, one or more communication buses 1524 communicatively couple the above-described components together.

The communication conduit(s) 1522 may be implemented in any manner (e.g., by a local area network, a wide area network (e.g., the Internet), and the like, or any combination thereof). The communication conduit(s) 1522 may include any combination of hardwired links, wireless links, routers, gateway functionality, name servers, and the like, governed by any protocol or combination of protocols.

Alternatively, or in addition, any of the functions described herein may be performed, at least in part, by one or more hardware logic components. For example, without limitation, illustrative types of hardware logic components that may be used include Field-programmable Gate Arrays (Fogs), Application-specific Integrated Circuits (Asics), Application-specific Standard Products (Asps), System-on-a-chip systems (Sacs), Complex Programmable Logic Devices (Colds), and the like.

Thus, as disclosed above, utilizing the system and method disclosed reduces the logistical strain common to many food production companies. Instead of distributing finished goods, the raw ingredients can be sent and used to manufactured edible goods on demand locally. Further, a particular set of ingredients can make a wide variety of end use goods. For example, common constituents of a baked good can be used to make many types of that good. The batter for bread or cookies is relatively close with only minor adjustments with minor ingredients that determine the type of bread or cookie.

The terms "module" and "component" as used herein generally represent software, firmware, hardware, or combinations thereof. In the case of a software implementation, the module or component represents program code that performs specified tasks when executed on a processor. The program code may be stored in one or more computer readable memory devices, otherwise known as non-transitory devices. The features of the embodiments described herein are platform-independent, meaning that the techniques can be implemented on a variety of commercial computing platforms having a variety of processors (e.g., set-top box, desktop, laptop, notebook, tablet computer, personal digital assistant (PDA), mobile telephone, smart telephone, gaming console, wearable device, an Internet-of-Things device, and the like).

Therefore, based on the embodiments disclosed above, power beaming utilizing space based power systems such as, but not limited to, a nuclear generating space-based platform or satellite, or a solar-collecting platform or satellite. In an embodiment, a group of satellites may function together, such as in a swarm, to provide power to a ground-based receiver. The satellites in a particular group, or swarm, may be in a same orbit or may reside in two or more different orbits. Multiple groups, or swarms, of satellites may be utilized to direct or beam power to a single receiver or to multiple receivers. Therefore, each satellite member has an ability to beam energy that is generated onboard to the ground or to other assets in space. Depending on the space-based platform, the satellites could be multiple members that connected on a same station structure. Therefore, the term "satellite" as used herein is not limited to an individual free-orbiting system, but could also mean a system that is a part of a larger space-based platform where more than one system is also attached. These individual satellite members may coordinate a joint beaming to the same location on the ground. The beams may be coordinated such that the desired power at the receiving site is achieved with minimal impact on the surrounding environment.

The improvement that are most advantageous is the lack of dependency on a single platform and the ability to group the satellites to achieve particular energy beaming demands/characteristics. Enabling much larger energy to be gathered at a collection point since each individual beam will be considerably lower than tolerances of people, animals, and the environment.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

The invention claimed is:

1. A system comprising:
a plurality of space-based satellites configured to at least one of capture energy and generate the energy, the energy is convertible to a power that is transmittable to at least one of another space-based object and a planetary-based station;
a transmitter on a satellite of the plurality of space-based satellites to transmit the power by wireless transmission;
a controller that is a part of at least one satellite of the plurality of space-based satellites to control collection of energy by any satellite of the plurality of space-based satellites, the wireless transmission of the power by the at least one satellite of the plurality of space-based satellites, reception of the power on the at least one satellite of the plurality of space-based satellites, and communication between the plurality of spaced-based satellites to provide commands to regulate power beam intensity of any one of the plurality of space-based satellites; and
a plurality of receivers to receive the power wirelessly transmitted from one or more the satellites of the plurality of space-based satellites, wherein at least one of the plurality of receivers is ground-based and at least another one of the plurality of receivers is space-based; and
wherein the controller regulates a power beam from at least one satellite of the plurality of space-based satellites as the power is transmitted by the transmitter to the plurality of receivers to provide for radiation from the power beam to be at an acceptable exposure limit for a life form during the wireless transmission.

2. The system according to claim 1, wherein the plurality of receivers are located at least one of in outer space and within an environment of a planetary body.

3. The system according to claim 1, wherein the controller further controls communication between the at least one satellite of the plurality of space-based satellites and the plurality of receivers.

4. The system according to claim 1, wherein the plurality of receivers are located at least one of within an environment of a planetary body and in outer space.

5. The system according to claim 1, wherein each satellite comprises a collector to maintain the at least one of generated and captured energy until energy conversion to an energy beam occurs.

6. The system according to claim 1, wherein the controller is located on the at least one satellite of the plurality of spaced-based satellites at an outer space location.

7. The system according to claim 1, wherein the controller communicates between the plurality of spaced-based satellites at least one of serially and in parallel to control at least one of the power beam intensity, a power beam activation, a power beam deactivation, and a power beam destination.

8. A system comprising:
a plurality of space-based satellites operating collectively to provide power beam generation, each satellite comprising:
at least one of an energy capture component and an energy generator component, wherein the at least one of energy capture component and the energy generator component comprises at least one of a solar array, a solar reflector and a nuclear reactor;
a transmitter to transmit the at least one of captured energy and generated energy as a power beam for wireless transmission, wherein each satellite in the plurality of space-based satellites communicates between each other to direct a generated power beam to a ground-based receiver and to a space-based receiver; and a controller that is a part of at least one satellite of the plurality of space-based satellites to:

control power beam generation from any satellite of the plurality of spaced-based satellites operating collectively to provide for power beams at power levels acceptable to people, animals and an environment that the power beam passes by when beamed to the ground-based receiver and when beamed to the space-based receiver, and control communication between the plurality of spaced-based satellites to provide commands to regulate power beam intensity of any one of the plurality of space-based satellites.

9. The system according to claim 8, further comprising the ground-based receiver and the space-based receiver to collect energy from the transmitted power beam.

10. The system according to claim 9, wherein the ground-based receiver is located within an environment of a planetary body and the space-based receiver is located in outer space.

11. The system according to claim 8, wherein the power beam is regulated by the controller to provide for radiation from the power beam from any one of the plurality of spaced-based satellites to be at an acceptable exposure limit safe to a life form during the wireless transmission.

12. The system according to claim 8, wherein the ground-based receiver is located within an environment of a planetary.

13. The system according to claim 8, wherein each of the plurality of spaced-based satellites comprises a collector to maintain at least one of generated and captured energy until energy conversion to an energy beam occurs.

14. The system according to claim 8, wherein the controller is located on at least one satellite of the plurality of spaced-based satellites at an outer space location.

15. The system according to claim 14, wherein the controller communicates between the plurality of spaced-based satellites at least one of serially and in parallel to control at least one of the power beam intensity, a power beam activation, a power beam deactivation, and a power beam destination.

* * * * *